(12) United States Patent
Henze et al.

(10) Patent No.: US 9,714,575 B2
(45) Date of Patent: Jul. 25, 2017

(54) DIFFERENTIAL BLADE DESIGN FOR PROPELLER NOISE REDUCTION

(71) Applicant: Hamilton Sundstrand Corporation, Windsor Locks, CT (US)

(72) Inventors: Chad M. Henze, Granby, CT (US); Daniel W. Shannon, Glastonbury, CT (US); Robert Hans Schlinker, Canton, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 773 days.

(21) Appl. No.: 14/091,700

(22) Filed: Nov. 27, 2013

(65) Prior Publication Data

US 2015/0147181 A1    May 28, 2015

(51) Int. Cl.
*B64C 11/16* (2006.01)
*F01D 5/02* (2006.01)
*B64C 11/18* (2006.01)

(52) U.S. Cl.
CPC ............. *F01D 5/02* (2013.01); *B64C 11/18* (2013.01)

(58) Field of Classification Search
CPC ........ B64C 11/008; B64C 11/18; B64C 11/00
USPC ................................................. 416/175, 203
See application file for complete search history.

(56) References Cited

U.S. PATENT DOCUMENTS

| | | | | |
|---|---|---|---|---|
| 463,322 A | * | 11/1891 | Sparr | B64C 11/48 |
| | | | | 416/200 R |
| 921,423 A | | 5/1909 | Mackaness | |
| 1,021,822 A | * | 4/1912 | Broussouse | B63H 1/14 |
| | | | | 416/200 R |
| 1,717,663 A | * | 6/1929 | Checkley | B63H 23/34 |
| | | | | 415/119 |
| 1,888,056 A | * | 11/1932 | Verzillo | B64C 11/16 |
| | | | | 416/203 |
| 1,913,590 A | * | 6/1933 | Ftacek | B64C 11/48 |
| | | | | 416/175 |
| 1,946,571 A | * | 2/1934 | Briner | B64C 11/36 |
| | | | | 416/175 |

(Continued)

FOREIGN PATENT DOCUMENTS

EP    0364689 A1    4/1990
FR    2990718 A1    11/2013

OTHER PUBLICATIONS

Communication and European Search Report; Application No. 14193762.3-1754; Date of Mailing: Apr. 7, 2015; 7 pages.

*Primary Examiner* — Gregory Anderson
*Assistant Examiner* — Jason Fountain
(74) *Attorney, Agent, or Firm* — Cantor Colburn LLP

(57) ABSTRACT

A propeller is provided including a hub and a first blade group and a second blade group. The first blade group includes at least one first propeller blade and the second blade group includes at least one second propeller blade. The at least one first propeller blade and the at least one second propeller blade are mounted to and equidistantly spaced about the hub. The at least one first propeller blade of the first blade group has at least one geometric characteristic different from the at least one propeller blade of the second blade group. The different blade groups will generate different noise signatures over a wider range of frequencies allowing for the design of low noise propeller systems.

7 Claims, 7 Drawing Sheets

(56) References Cited

U.S. PATENT DOCUMENTS

| | | | | |
|---|---|---|---|---|
| 2,222,444 A | * | 11/1940 | Schmidt | B64C 11/16 416/203 |
| 4,767,269 A | * | 8/1988 | Brandt | B63H 5/10 415/143 |
| 5,482,436 A | * | 1/1996 | Bohanon, Sr. | F04D 29/325 416/200 R |
| 5,735,670 A | | 4/1998 | Moffitt et al. | |
| 2006/0292009 A1 | * | 12/2006 | Arata | B64C 27/32 416/203 |

* cited by examiner

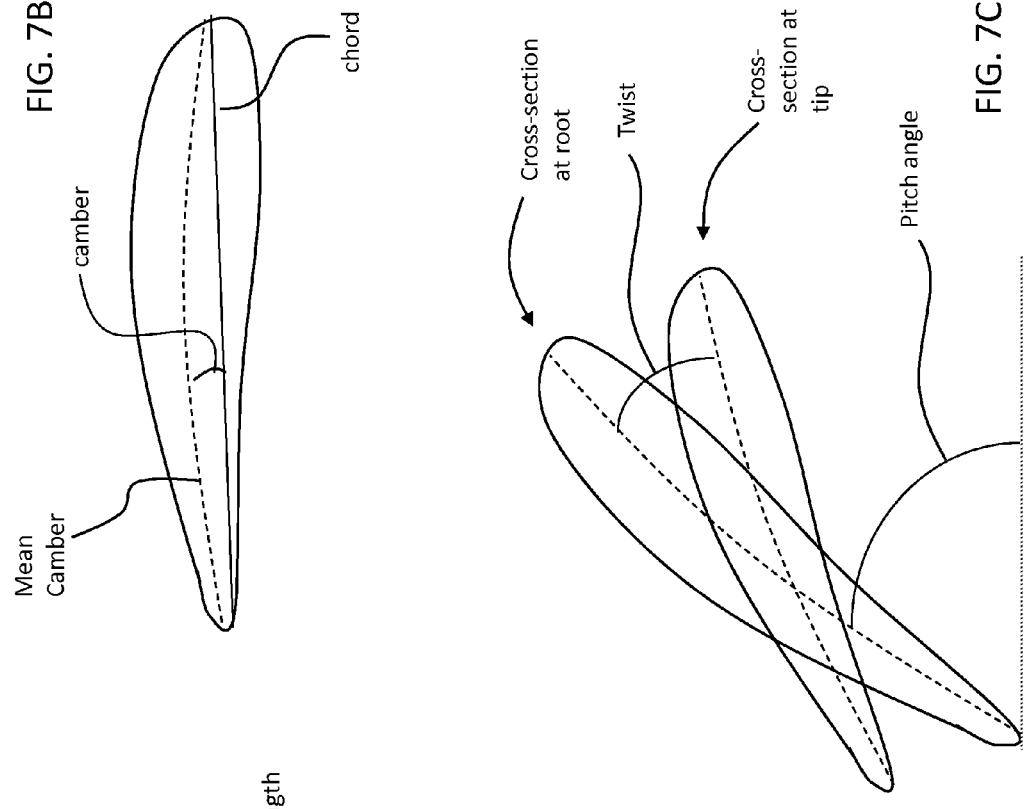
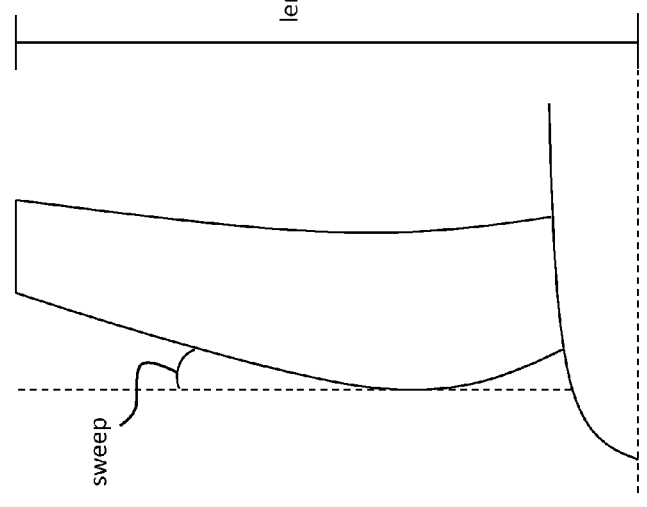

US 9,714,575 B2

DIFFERENTIAL BLADE DESIGN FOR PROPELLER NOISE REDUCTION

BACKGROUND OF THE INVENTION

Embodiments of the invention relate to a propeller of an aircraft, and more particularly, to reducing the noise generated by the propeller during operation of the aircraft.

Propeller driven aircrafts have near field and interior noise that include noise signature content related to operation of the propeller. Near field noise outside of the aircraft can create pressure fluctuations that may fatigue the structure of the aircraft. This near field noise can also result in interior noise, audible within the fuselage, making the aircraft less comfortable for passengers situated therein. Propeller noise will also propagate to the far field becoming an annoyance factor for those living near an airport.

Various methods have been employed to reduce propeller noise, including the use of swept blade propellers, increased blade count, active noise control, and tuned mechanical dampers within or on the fuselage. On multi-engine aircrafts, angular phasing of the propellers has long been used to alter the characteristics of the propeller noise perceptible within the fuselage. In spite of the various methods used to reduce noise generated by the propellers of a propeller driven aircraft, there remains a need for further improvement.

BRIEF DESCRIPTION OF THE INVENTION

According to one embodiment of the invention, a propeller is provided including a hub and a first blade group and a second blade group. The first blade group includes at least one first propeller blade and the second blade group includes at least one second propeller blade. The at least one first propeller blades in the first blade group and the at least one second propeller blade in the second blade group are mounted to and equidistantly spaced about the hub. The at least one first propeller blade of the first blade group has at least one geometric characteristic different from the at least one propeller blade of the second blade group.

According to another embodiment of the invention, a propeller is provided including a hub and a first blade group and a second blade group. The first blade group includes at least one first propeller blade and the second blade group includes at least one second propeller blade. Each of the first propeller blades is substantially identical and each of the second propeller blades is substantially identical. The at least one first propeller blade and the at least one second propeller blade are mounted to and equidistantly spaced about the hub. The at least one first propeller blade of the first blade group is configured to generate noise at a first noise signature and the at least one second propeller blade of the second blade group is configured to generate noise at a second noise signature. The first noise signature and the second noise signature are different.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIGS. 7A-7C are various views illustrating the geometric characteristics of a propeller blade.

The detailed description explains embodiments of the invention, together with advantages and features, by way of example with reference to the drawings.

DETAILED DESCRIPTION OF THE INVENTION

Figure 1:
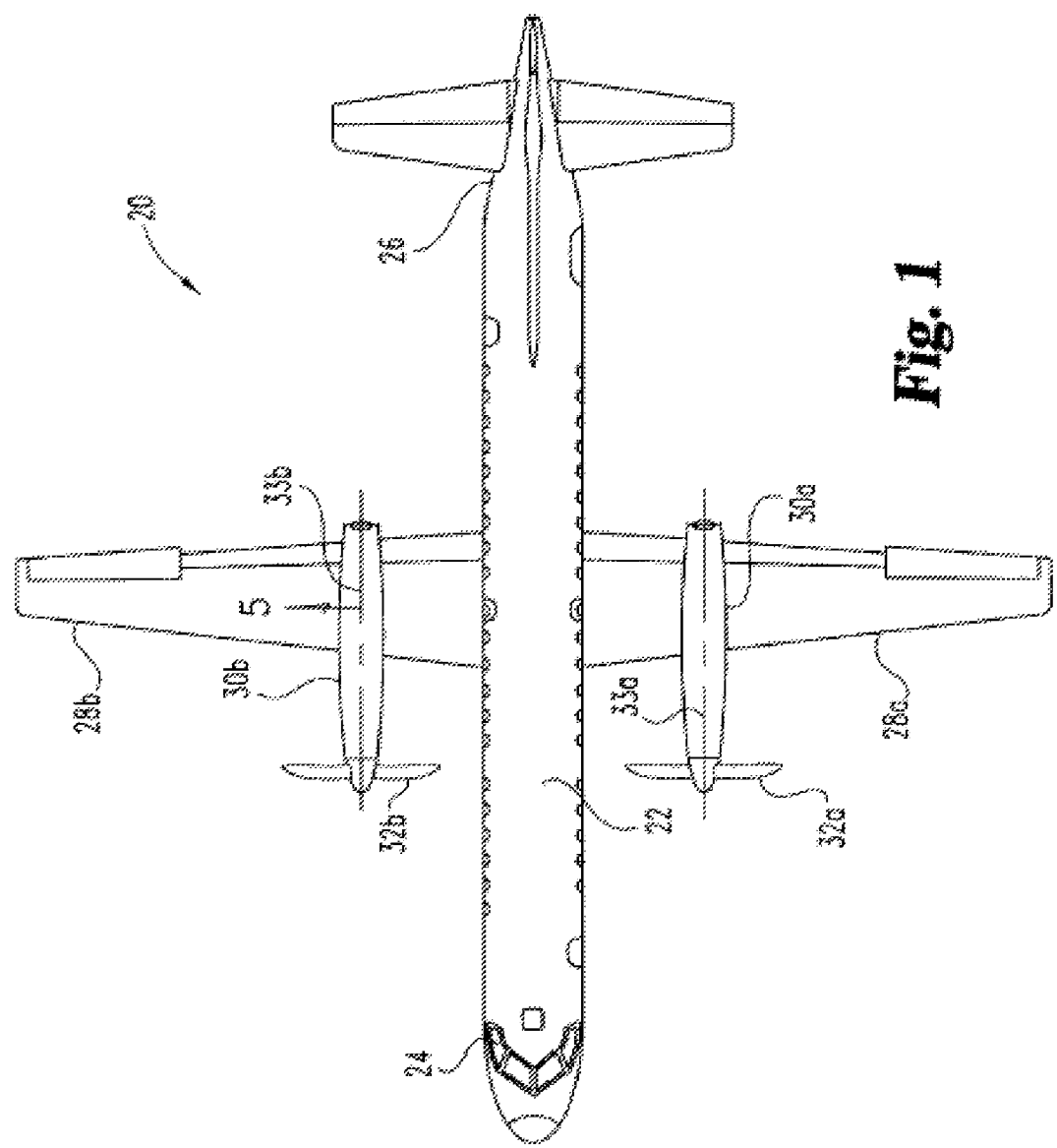
FIG. 1 is a top view of an aircraft having two propellers.

FIG. 1 is a top plane view of an aircraft 20 including a fuselage 22, a cockpit 24, and a tail 26. Attached to the fuselage 22 are left and right wings 28a, 28b respectively. Each wing 28 incorporates a nacelle 30 which includes a propeller 32 powered by an engine 34. Each propeller 32 is configured to rotate about a rotational axis 33. Though a specific aircraft is illustrated and described herein, other propeller driven aircrafts are within the scope of the invention.

Figure 2:
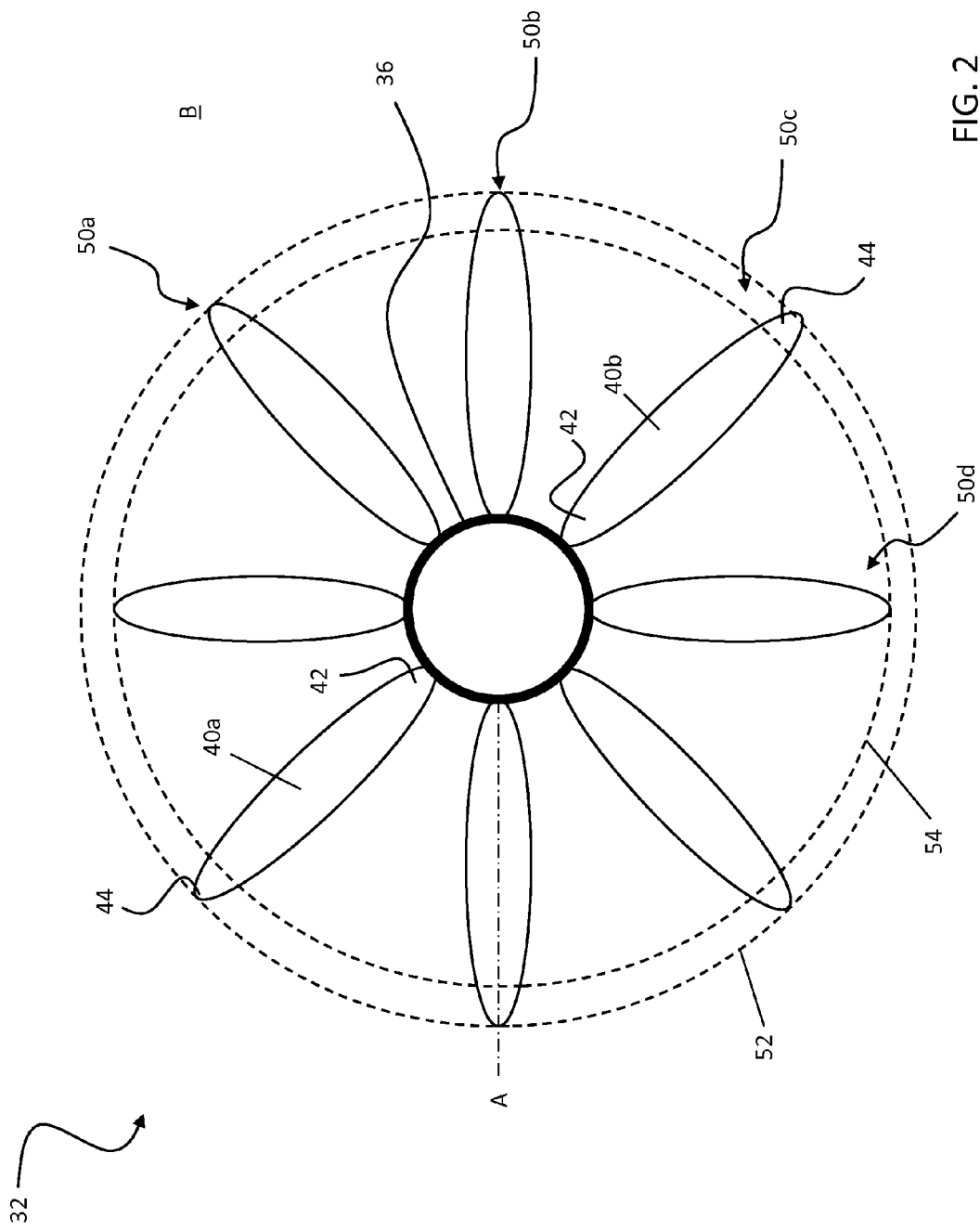
FIG. 2 is a front view of a propeller according to an embodiment of the invention.
Figure 3:
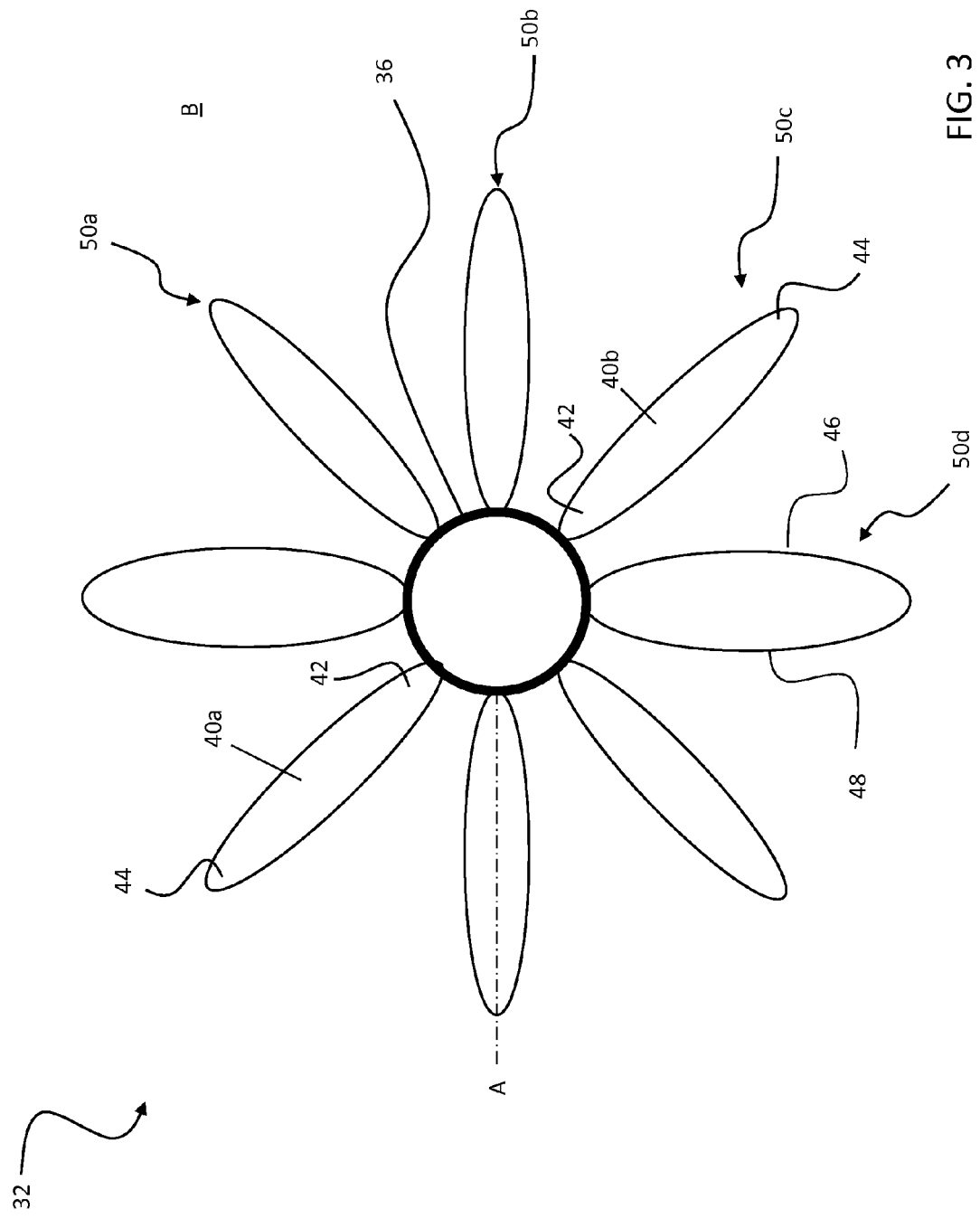
FIG. 3 is a front view of a propeller according to another embodiment of the invention.
Figure 4:
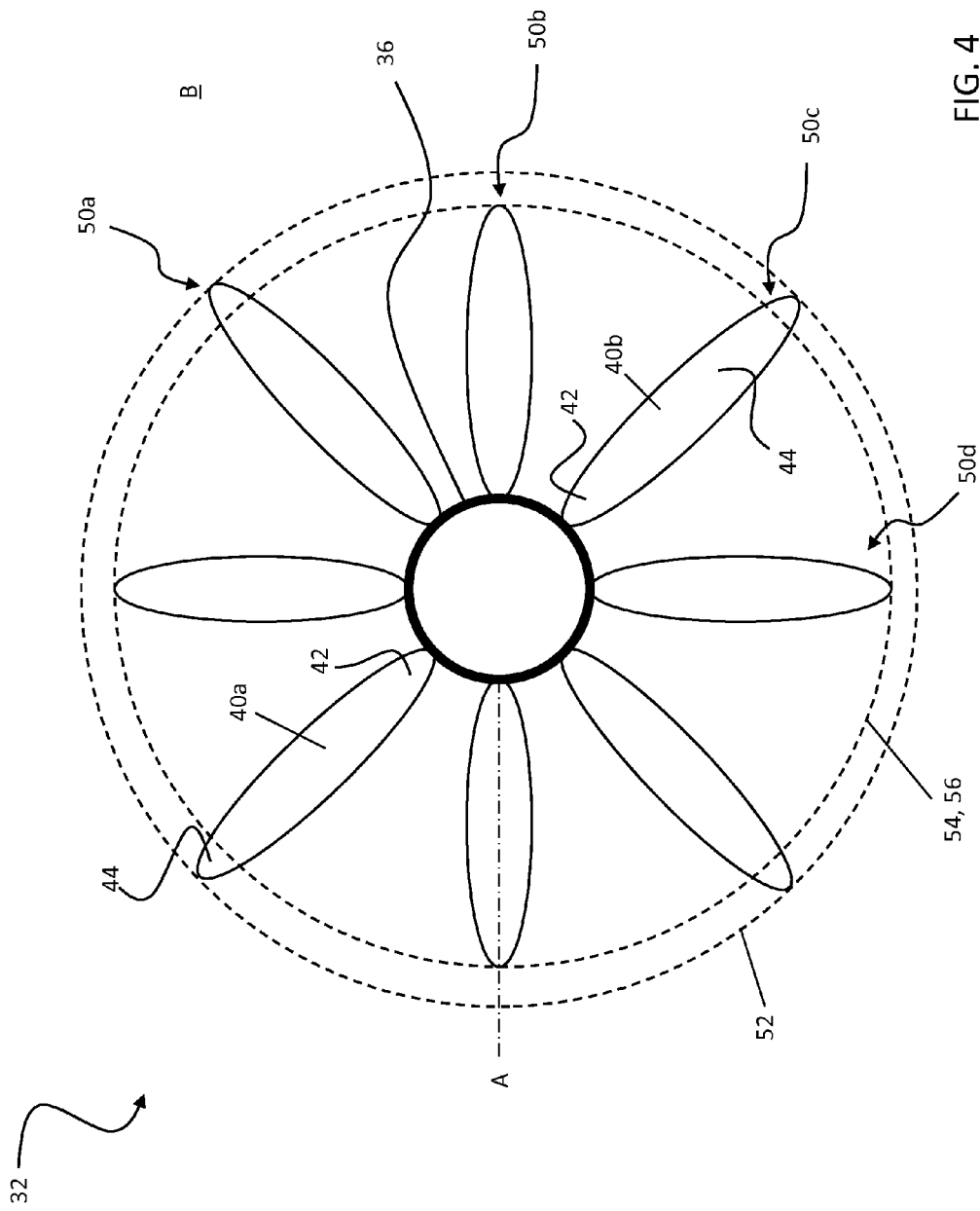
FIG. 4 is a front view of a propeller according to yet another embodiment of the invention.

Referring now to FIGS. 2-4, a propeller 32 of an aircraft 20 is illustrated in more detail. The propeller 32 includes a plurality of propeller blades 40 individually mounted at a first or root end 42 to a centrally located propeller hub 36. The propeller hub 36 is configured to rotate about the rotational axis 33. Each of the plurality of propeller blades 40 extends radially outward from the hub 36 such that the second end 44 of each blade 40 is generally arranged within a plane B. Plane B is oriented substantially perpendicularly to the axis of rotation 33 of the propeller hub 36. In one embodiment, the propeller 32 is a portion of a variable pitch system such that each propeller blade 40 is rotatable relative to the hub 36 about an axis A extending from the root end 42 to the second end 44 of each blade 40.

The propeller blades 40 are generally arranged in equidistantly spaced groups 50 about the circumference of the propeller hub 36, each group 50 having one two or more substantially identical propeller blades 40 positioned to maintain the balance of the propeller 32 with respect to both weight and aerodynamic forces. For example, a common propeller group 50 is a pair including a first propeller blade 40a, and a second propeller blade 40b mounted diametrically opposite, or antipodal, one another about the propeller hub 36. Although the FIGS. generally illustrate the propeller groups 50 as blade pairs, other blade configurations having any number of substantially identical propeller blades 40 spaced equidistantly about the propeller hub 36, such as a blade triplet including three blades 40 for example, is within the scope of the invention. In each of the illustrated, non-limiting embodiments, the propeller 32 has eight blades 40 arranged in four blade groups 50; however, propellers 32 having any number of blade groups 50, each blade group 50 having any number of propeller blades 40, are within the scope of the invention.

The noise signature generated by each blade 40 as the hub 36 rotates about its axis 33 is determined by the loading applied over the blade 40. In a conventional propeller, each of the plurality of blade groups 50 is substantially identical, and thus each blade group 50 generates the same noise signature. The propellers 32 illustrated in FIGS. 2-6, however, include at least one propeller blade group 50 having one or more geometric characteristics substantially different from the other blades groups 50 of the propeller 32. Consequently, the at least one blade group 50 having a different geometric characteristic also has a different noise signature from the remainder of the blade groups 50 of the propeller 32. Exemplary geometric characteristics that may vary between blades groups 50, include, but are not limited to, length, chord, blade angle, camber, and twist for example (see FIGS. 7A-7C).

The length of the propeller blades 40 of each blade group 50 is the distance measured from a second end 44 of the first propeller blade 40a to a center of the rotor hub. In the illustrated, non-limiting embodiment of FIG. 2, the propeller blades 40 of the first, second, and third blade groups 50a, 50b, 50c, have a first length, illustrated by dotted circle 52. However, each of the propeller blades 40 of the fourth blade group 50d has a second length, illustrated by dotted circle 54, different from the first length of the other blade groups 50a, 50b, 50c. Thus, the distinct geometric characteristic of the propeller blades 40 of the fourth blade group 50 generates a noise signature different from that of the propeller blades 40 of the first, second, and third blade groups 50a, 50b, 50c. In another embodiment, the spanwise chord distribution, or the distance between a leading edge 46 and a trailing edge 48 of each of the propeller blades 40 of the fourth blade group 50d is different from the propeller blades 40 of the other blade groups 50a, 50b, 50c (FIG. 3).

Figure 5:
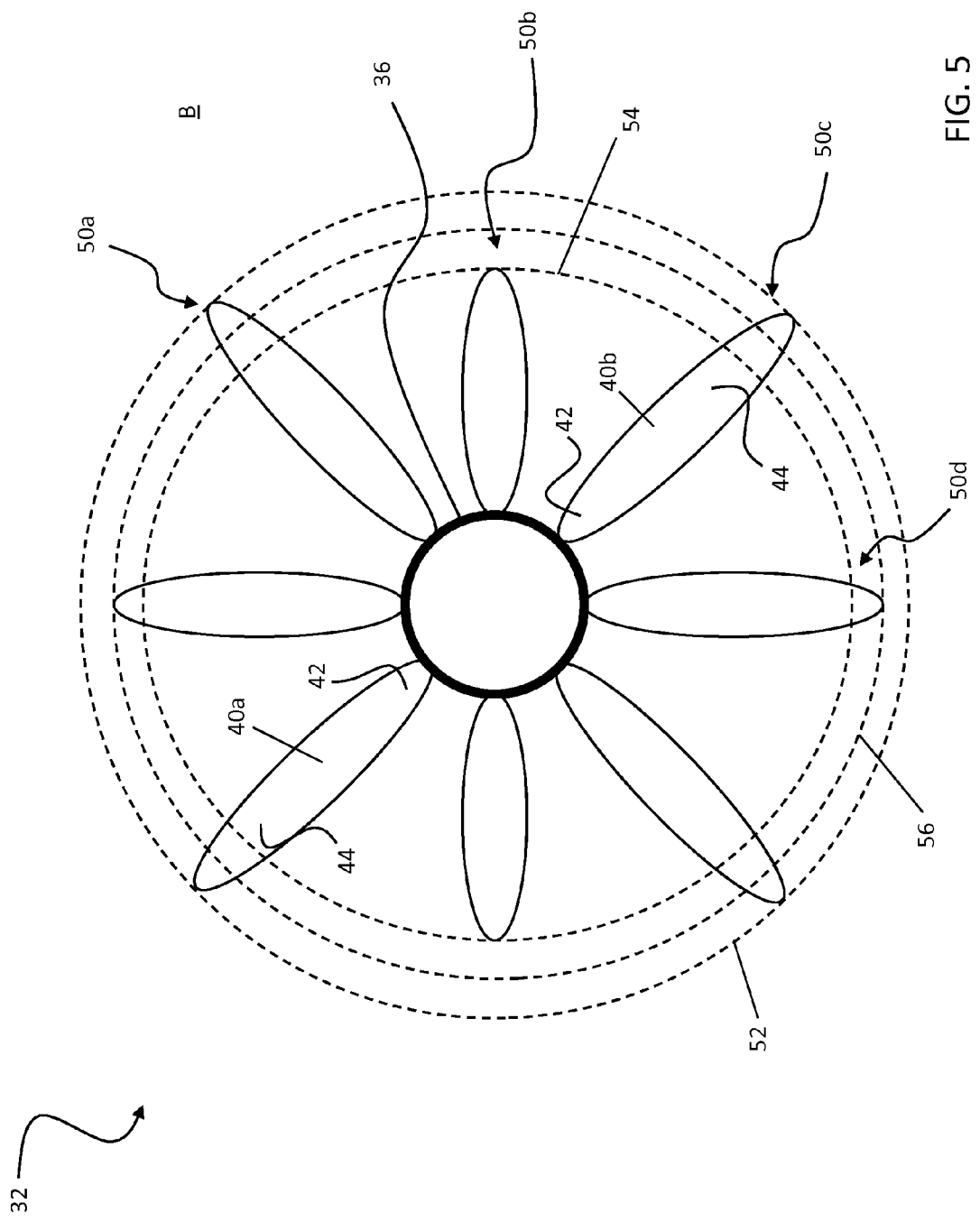
FIG. 5 is a front view of a propeller according to another embodiment of the invention.
Figure 6:
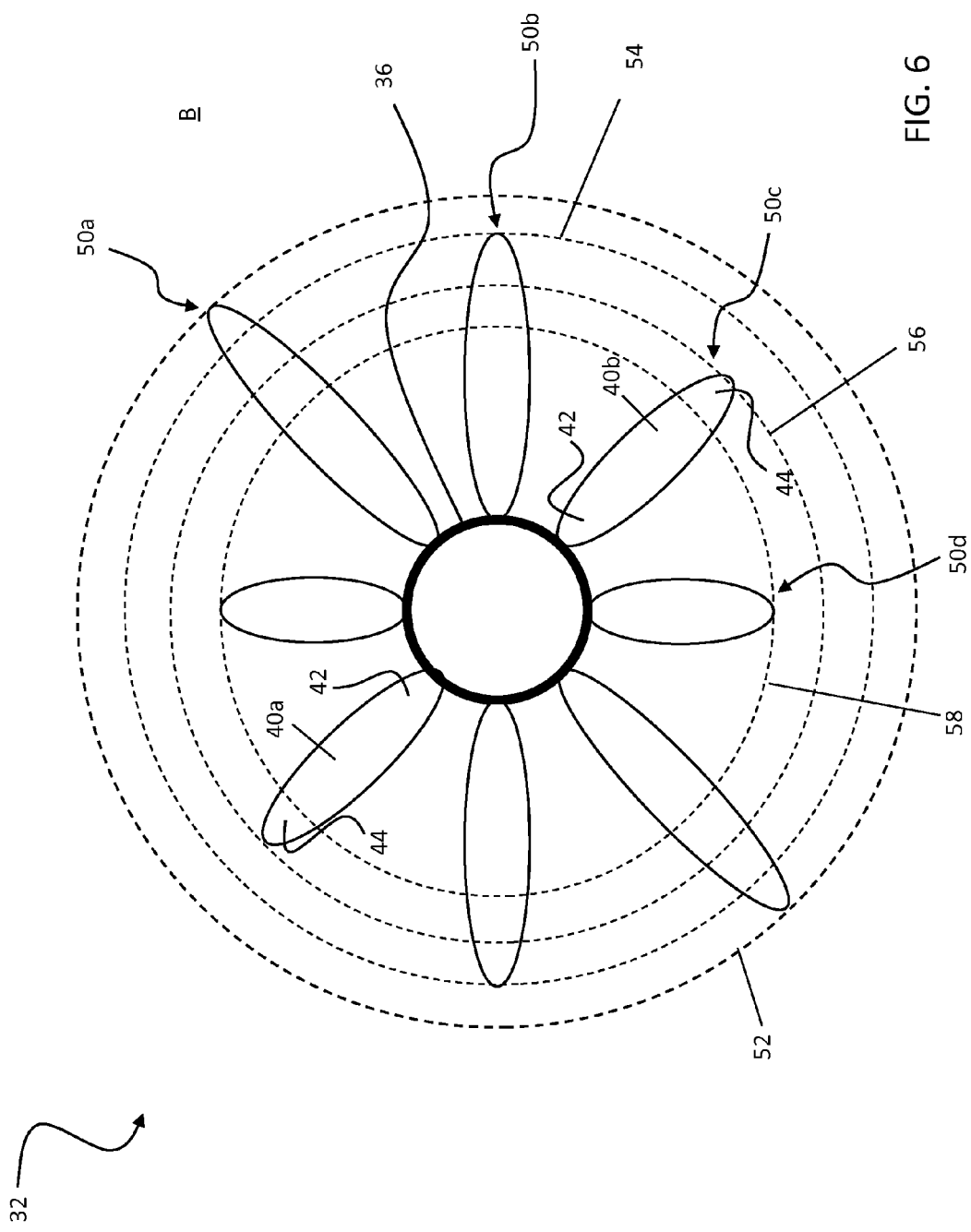
FIG. 6 is a front view of a propeller according to another embodiment of the invention.

Referring now to FIGS. 4-6, more than one blade group 50 may have at least one geometric characteristic substantially different from the remainder of the plurality of blade groups 50. For example, the first and third blade groups 50a, 50c, may have substantially identical geometric characteristics such that the propeller blades 40 of the first and third blade groups 50a, 50c generate identical noise signatures. The propeller blades 40 of the second blade group 50b may have at least a first geometric characteristic different from the blades 40 of the first and third blade groups 50a, 50c. Similarly, the propeller blades 40 of the fourth blade group 50d may have at least a first geometric characteristic different from the blades 40 of the first and third blade groups 50a, 50c. In one embodiment, the first geometric characteristic of the second blade group 50b and the first characteristic of the fourth blade group 50d may be different types of geometric characteristics, for example, blade angle and camber. Alternatively, the first geometric characteristic of the second blade group 50b and the first characteristic of the fourth blade group 50d may be the same type of geometric characteristic, such as length for example.

In such embodiments, the first geometric characteristic of the second blade group 50b may be substantially equal to the first geometric characteristic of the fourth blade group 50d (FIG. 4). If the blades 40 of the second blade group 50b and the fourth blade group 50d are substantially identical, the noise signatures generated by the propeller blades 40 of the second and fourth blade groups 50b, 50d are the same, but distinct from the noise signatures of the propeller blades 40 of the first and third blade groups 50a, 50c. In another embodiment, illustrated in FIG. 5, the first geometric characteristic of the fourth blade group 50d may differ from the first geometric characteristic of the second blade group 50b, even though the first geometric characteristics are the same type of characteristic. As a result, the noise signature of the propeller blades 40 of the second blade group 50b will be distinguishable from the noise signature of the propeller blades 40 of the fourth blade group 50d.

In yet another embodiment, the propeller blades 40 of each blade group 50 of the propeller 32 have one or more unique geometric characteristics such that propeller blades 40 of each blade group 50 generate a distinctive noise signature. In the illustrated, non-limiting embodiment of FIG. 6, a first blade group 50a has a first length 52, the second blade group 50b has a second length 54, the third blade group 50c has a third length, and the fourth blade group 50d has a fourth length. As illustrated, the first length 52, second length 54, third length 56, and fourth length 58 are substantially different from one another. Although the same type of geometric characteristic is used to distinguish the blade pairs 50 in the illustrated embodiment, a propeller 32 where a different type of geometric characteristic distinguishes one or more of the blade group 50 from the remainder of blade group 50 is within the scope of the invention. For example, the propeller blades 40 of the first blade group 50a may have a unique length, the propeller blades 40 of the second blade group 50b may have a unique chord, the propeller blades 40 of the third blade group 50c may have a distinct blade angle, and the propeller blades 40 of the fourth blade group 50d may have a distinct twist.

When one or more geometric characteristics of at least one of the propeller blades 40 is varied, the resultant differential loading on the propeller 32 generates multiple noise signatures with energy spread over a larger range of frequencies. By customizing the noise signatures generated the far-field and near-field noise of the propeller may be reduced.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A propeller comprising:
   a hub;
   a first blade group having at least one first propeller blade, each first propeller blade having a first hub end connected to the hub and extending radially outward from the hub to a first tip end;
   a second blade group having at least one second propeller blade, the at least one first propeller blade and the at least one second propeller blade being mounted to and equidistantly spaced about the hub, each second propeller blade having a second hub end connected to the hub and extending radially outward from the hub to a second tip end, wherein the at least one first propeller blade of the first blade group has at least one geometric characteristic different from the at least one second propeller blade of the second blade group; and
   a third blade group having at least one third propeller blade mounted to and equidistantly spaced about the hub, where each of the third propeller blades of the third blade group are substantially identical;
   wherein the first tip end and the second tip end are disposed in a common plane perpendicular to an axis of rotation of the hub;

wherein the geometric characteristic is one of length, chord, camber, blade angle, and twist;

wherein each of the first propeller blades of the first blade group are substantially identical and each of the second propeller blades of the second blade group are substantially identical;

wherein at least one geometric characteristic of the at least one first propeller blade of the first blade group is different from the at least one third propeller blade of the third blade group, and wherein the at least one second propeller blade of the second blade group and the at least one third propeller blade of the third blade group are substantially identical.

2. The propeller according to claim 1, further comprising a fourth blade group having at least one fourth propeller blade mounted to and equidistantly spaced about the hub, where each of the fourth propeller blades of the fourth blade group are substantially identical.

3. The propeller according to claim 2, wherein at least one geometric characteristic of the at least one first propeller blade of the first blade group is different from the at least one fourth propeller blade of the fourth blade group.

4. The propeller according to claim 3, wherein at least one geometric characteristic of the at least one third propeller blade of the third blade group is different from the at least one fourth propeller blade of the fourth blade group.

5. A propeller comprising:

a hub;

a first blade group having at least one first propeller blade, each first propeller blade having a first hub end connected to the hub and extending radially outward from the hub to a first tip end; and a second blade group having at least one second propeller blade, each second propeller blade having a second hub end connected to the hub and extending radially outward from the hub to a second tip end, each of the first propeller blades being substantially identical and each of the second propeller blades being substantially identical, the at least one first propeller blade and the at least one second propeller blade being mounted to and equidistantly spaced about the hub, wherein the at least one first propeller blade of the first blade group is configured to generate noise at a first noise signature and the at least one second propeller blade of the second blade group is configured to generate noise at a second noise signature, the first noise signature and the second noise signature being different from one another; and a third blade group having at least one third propeller blade mounted to and equidistantly spaced about the hub, where each of the third propeller blades of the third blade group are substantially identical, and the at least one third propeller blade of the third blade group being configured to generate noise at a third noise signature;

wherein the first tip end and the second tip end are disposed in a common plane perpendicular to an axis of rotation of the hub;

wherein each of the first propeller blades of the first blade group are substantially identical and each of the second propeller blades of the second blade group are substantially identical;

wherein at least one geometric characteristic of the at least one first propeller blade of the first blade group is different from the at least one third propeller blade of the third blade group, and wherein the at least one second propeller blade of the second blade group and the at least one third propeller blade of the third blade group are substantially identical.

6. The propeller according to claim 5, further comprising a fourth blade group having at least one fourth propeller blade, each fourth propeller blade being substantially identical, the at least one fourth propeller blade being mounted to and equidistantly spaced about the hub, the at least one fourth propeller blade of the fourth blade group being configured to generate noise at a fourth noise signature.

7. The propeller according to claim 6, wherein each of the first noise signature, second noise signature, third noise signature, and fourth noise signature are substantially different.

* * * * *